(12) United States Patent
Basu et al.

(10) Patent No.: US 9,495,683 B2
(45) Date of Patent: *Nov. 15, 2016

(54) PROCESS AND WORKFLOW FOR ENTERPRISE DATA MATCHING

(75) Inventors: Kohinoor Basu, Irvine, CA (US); Angel Barnachea Chua, Aliso Viejo, CA (US); Matthew M. Ferry, Lake Forest, CA (US); Scott Arthur Roberts, Irvine, CA (US)

(73) Assignee: IHEARTMEDIA MANAGEMENT SERVICES, INC., San Antonio, TX (US)

( * ) Notice: Subject to any disclaimer, the term of this patent is extended or adjusted under 35 U.S.C. 154(b) by 1242 days.

This patent is subject to a terminal disclaimer.

(21) Appl. No.: 12/642,860

(22) Filed: Dec. 21, 2009

(65) Prior Publication Data

US 2011/0153628 A1    Jun. 23, 2011

(51) Int. Cl.
*G06F 17/30* (2006.01)
*G06Q 30/02* (2012.01)

(52) U.S. Cl.
CPC ............ *G06Q 30/02* (2013.01); *G06F 17/303* (2013.01); *G06F 17/30303* (2013.01)

(58) Field of Classification Search
CPC ....................... G06F 17/303; G06F 17/30303
USPC .......................................................... 707/737
See application file for complete search history.

(56) References Cited

U.S. PATENT DOCUMENTS

| | | | |
|---|---|---|---|
| 6,035,307 A | 3/2000 | Martin et al. | |
| 6,338,043 B1 | 1/2002 | Miller | |
| 6,513,065 B1 | 1/2003 | Hafez et al. | |
| 6,615,258 B1 | 9/2003 | Barry et al. | |
| 6,718,551 B1 | 4/2004 | Swix et al. | |
| 6,937,996 B1 | 8/2005 | Forsythe et al. | |
| 7,657,540 B1 * | 2/2010 | Bayliss ................. | G06Q 10/10 707/609 |
| 7,818,662 B2 * | 10/2010 | Nene et al. .................... | 715/224 |
| 7,912,842 B1 * | 3/2011 | Bayliss ............. | G06F 17/30303 707/749 |
| 2004/0243539 A1 * | 12/2004 | Skurtovich, Jr. ...... | G06Q 40/02 |
| 2006/0178954 A1 * | 8/2006 | Thukral et al. ................. | 705/28 |
| 2007/0156766 A1 * | 7/2007 | Hoang ............. | G06F 17/30014 |
| 2007/0156767 A1 * | 7/2007 | Hoang ............. | G06F 17/30014 |
| 2008/0189279 A1 * | 8/2008 | Mayer et al. ..................... | 707/6 |
| 2008/0235249 A1 * | 9/2008 | Stephens et al. ............. | 707/100 |
| 2011/0154230 A1 * | 6/2011 | Basu et al. ..................... | 715/764 |
| 2011/0231246 A1 * | 9/2011 | Bhatia et al. .............. | 705/14.43 |

* cited by examiner

*Primary Examiner* — Alexey Shmatov
*Assistant Examiner* — Kurt Mueller
(74) *Attorney, Agent, or Firm* — Garlick & Markison; Edward J. Marshall

(57) ABSTRACT

A method and system for managing a media advertising enterprise including process and workflow capabilities for enterprise data matching. An EDM (Enterprise Data Management) module can be configured to include a set of rules at an enterprise level to manage disparate and disconnected records associated with an entity. A number of unmatched and enterprise entities that matches with respect to an active entity can be returned based on a fuzzy logic. A matching process can then be performed to accurately match the active entity and the unmatched entities with respect to a parent enterprise entity. The unmatched entity can be put on hold if additional information is required for performing a right match after assigning the parent enterprise entity. A note can also be added in order to place the unmatched entity on hold. Such an optimization mechanism can interactively manage and report records at the enterprise level in a simple and efficient manner.

16 Claims, 10 Drawing Sheets

PROCESS AND WORKFLOW FOR ENTERPRISE DATA MATCHING

TECHNICAL FIELD

Embodiments are generally related to enterprise data-processing systems and methods. Embodiments also relate in general to the field of computers and similar technologies and, in particular to, software utilized in this field. In addition, embodiments relate to the management of advertising data.

BACKGROUND OF THE INVENTION

Advertising forms an important part of broadcast programming including broadcast video (e.g., television), radio, and printed media. Advertising management systems are distributed systems where local entities create and manage advertiser and agency content and records. Such systems often possess a large number of duplicate advertiser and agency records in their database(s). Integrating such distributed systems into an enterprise environment can create duplicate entries, compatibility issues, connection difficulties, redundancy issues, and other significant inefficiencies.

Many distributed and disconnected legacy systems utilized by media outlets typically include a large number of duplicate advertiser and agency records. One of the main problems associated with conventional techniques for managing such records is the lack of effective tools for scoring, evaluating, and comparing data with respect to a single enterprise. For example, consider a user belonging to a market associated with an enterprise that creates a new advertiser named 'Baja Fresh' and another user who belongs to another market associated with the same enterprise creates a new advertiser 'Baja Grill' with a slight variation in the name (i.e., "Baja"). Technically, both these advertiser names refer to the same master advertiser, which is 'Baja Fresh'. Hence, it is important to have a single instance of an advertiser and not multiple duplicates for management and reporting purposes. Another problem associated with conventional advertising techniques involves management and reporting of large amounts of data by local users, which is time consuming and inefficient.

Based on the foregoing, it is believed that a need exists for an improved method and system for managing media advertising enterprise data. A need also exists for an improved matching process to accurately match similar records, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved enterprise data-processing system and method.

It is another aspect of the disclosed embodiments to provide for an improved method and system for managing media advertising enterprise data.

It is a further aspect of the disclosed embodiments to provide for an improved matching process to accurately match similar records.

The aforementioned aspects and other objectives and advantages can now be achieved as described herein. A method and system for managing media advertising enterprise data is disclosed herein. An EDM (Enterprise Data Management) application module can be configured to include a set of rules at an enterprise level to manage disparate and disconnected records associated with an entity (e.g., advertiser or agency). A number of unmatched and enterprise entities that matches with respect to an active entity can be returned based on a fuzzy logic. A matching process can then be performed to accurately match the active entity and the unmatched entities with respect to a parent enterprise entity. The unmatched entity can be put on hold if additional information is required for performing a right match after assigning the parent enterprise entity. A note can also be added in order to place the unmatched entity on hold. Such an optimization mechanism can interactively manage and report records at the enterprise level in a simple and efficient manner.

A scoring function with respect to each record can be computed based on the rules to determine the highest priority. The matching process can be performed if the active entity, unmatched entity, and the enterprise entity section are populated with the required data. The unmatched entities can be matched one record at a time and can be assigned to the enterprise entity that is selected by default. A different enterprise entity can also be selected if the default selected enterprise entity is not appropriate. The records can be assigned to the enterprise entity iteratively or can be assigned all at once. Additionally, few entities can be assigned to one enterprise entity and the other entities can be assigned to a different enterprise entity. The user needs to ensure that the selected enterprise entity is a potential match while placing an entity on hold.

A new enterprise entity can be created or the required enterprise entity can be searched if the unmatched entities do not match with the selected enterprise entity. The matching process can be repeated for each entity in the unmatched entities selection until all the entities matches to the selected enterprise entity. The on-hold entities can be resolved by matching it to the original enterprise entity, releasing the entities back to the pool, matching it to a different enterprise entity, or creating a new enterprise entity for matching. The unmatched entities on-hold can be viewed and resolved by any user.

A user interface, in conjunction with the EDM application, provides a unique and innovative way to store, retrieve, and manipulate data from existing databases containing media-related data. By using the database with a simplified storage and retrieval protocol, the data contained therein can be effectively manipulated in real time. The user interface provides access to the EDM application in a simple and straightforward manner, significantly reducing training time.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
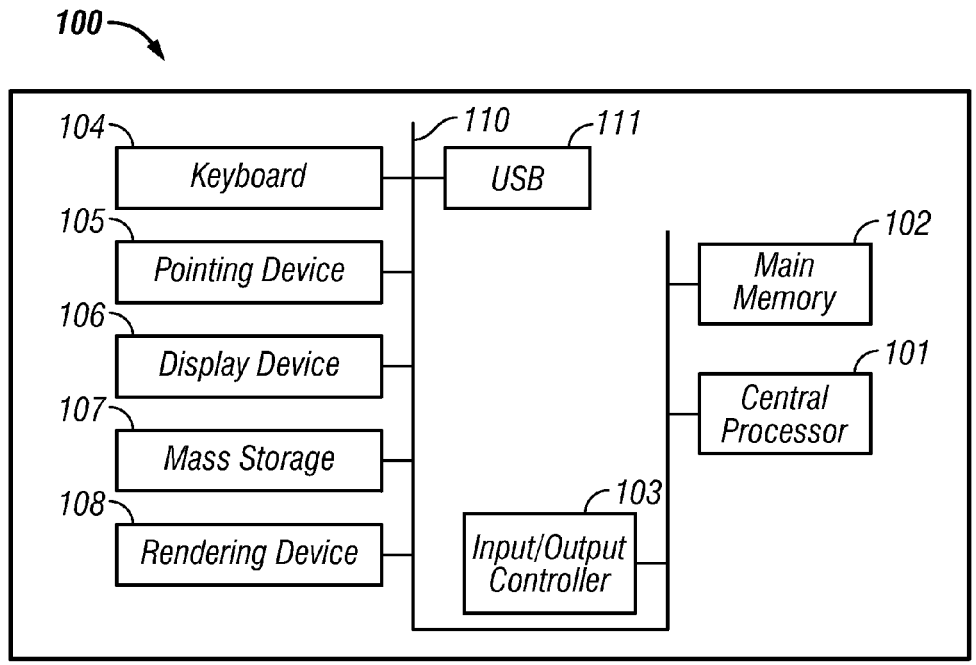
FIG. 1 illustrates a schematic view of a data-processing system in which an embodiment may be implemented.
Figure 2:
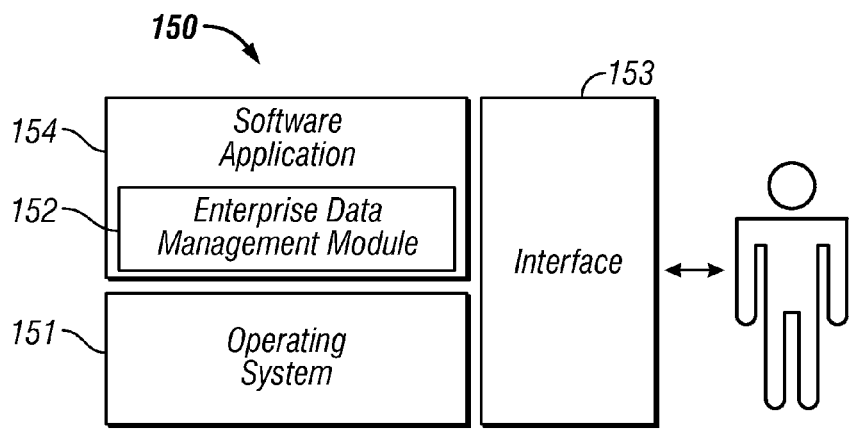
FIG. 2 illustrates a schematic view of a software system including an operating system, application software, and a user interface for carrying out an embodiment.
Figure 3:
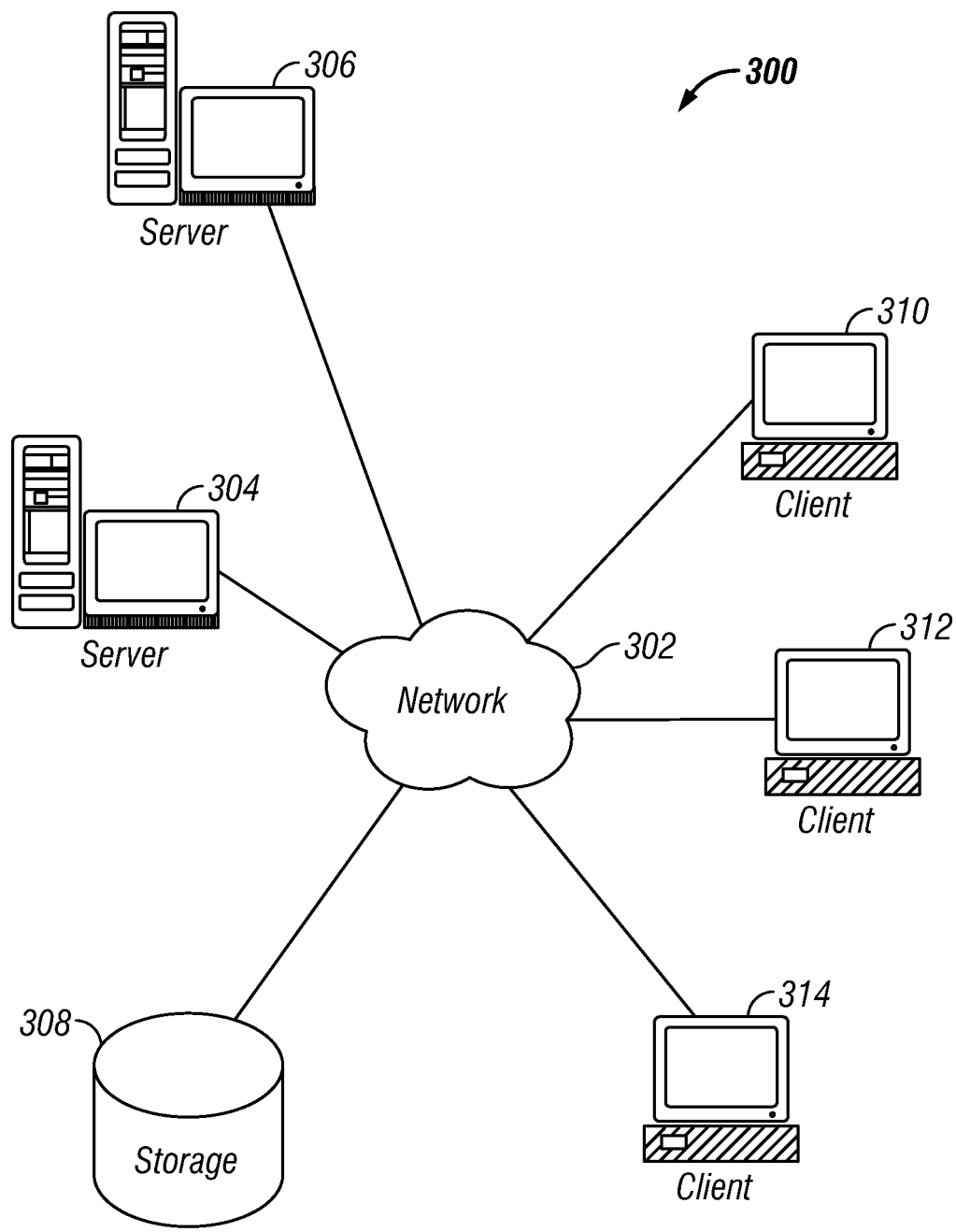
FIG. 3 illustrates a graphical representation of a network of data-processing systems in which aspects of the disclosed embodiments may be implemented.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, a keyboard 104, an input device 105 (e.g., a pointing device, such as a mouse, track ball, pen device, etc), a display device 106, a mass storage 107 (e.g., a hard disk), and a USB (Universal Serial Bus) peripheral connection 111. Additional input/output devices, such as a rendering device 108 (e.g., printer, scanner, fax machine, etc), for example, may be associated with the data-processing system 100 as desired. As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the method and system may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), can serve to display results, whereupon a user may supply additional inputs or terminate a particular session. In some embodiments, operating system 151 and interface 153 can be implemented in the context of a "Windows" system. It can be appreciated, of course, that other types of operating systems and interfaces may be alternatively utilized. For example, rather than a traditional "Windows" system, other operation systems such as, for example, Linux may also be employed with respect to operating system 151 and interface 153. The software application 154 can include, for example, an EDM module 152 for managing media advertising enterprise data in a business management application. The EDM module 152 generally configures a set of rules at an enterprise level to manage disparate and disconnected records. EDM module 152 can include instructions such as those of method 500 and 700 respectively discussed herein with respect to FIG. 5 and FIG. 7.

FIG. 3 illustrates a graphical representation of a network of data-processing systems in which aspects of the disclosed embodiments may be implemented. Network data-processing system 300 is a network of computers in which embodiments of the present invention may be implemented. Network data-processing system 300 contains network 302, which is the medium used to provide communications links between various devices and computers connected together within network data-processing apparatus 300. Network 302 may include connections such as wire, wireless communication links, or fiber optic cables.

In the depicted example, server 304 and server 306 connect to and communicate with network 302 along with storage unit 308 (e.g. a memory, database, etc). In addition, clients 310, 312, and 314 connect to and communicate with network 302. These clients 310, 312, and 314 may be, for example, personal computers or network computers. Data-processing system 100 depicted in FIG. 1 can be, for example, a client such as client 310, 312, and/or 314. Alternatively, data-processing system 100 can be implemented as a server such as servers 304 and/or 306, depending upon design considerations.

In the depicted example, server 304 provides data such as boot files, operating system images, and applications to clients 310, 312, and 314. Clients 310, 312, and 314 are clients to server 304 in this example. Network data-processing system 300 may include additional servers, clients, and other devices not shown. Specifically, clients may connect to any member of a network of servers which provide equivalent content.

In the depicted example, network data-processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 300 also may be implemented as a number of different types of networks such as, for example, an intranet, a local area network (LAN), or a wide area network (WAN).

FIGS. 1-3 are thus intended as an example and not as an architectural limitation with respect to particular embodiments. Such embodiments, however, are not limited to any particular application or any particular computing or data-processing environment. Instead, those skilled in the art will appreciate that the disclosed method and system may be advantageously applied to a variety of system and application software. Moreover, the present invention may be embodied on a variety of different computing platforms, including Macintosh, UNIX, LINUX, and the like.

Figure 4:
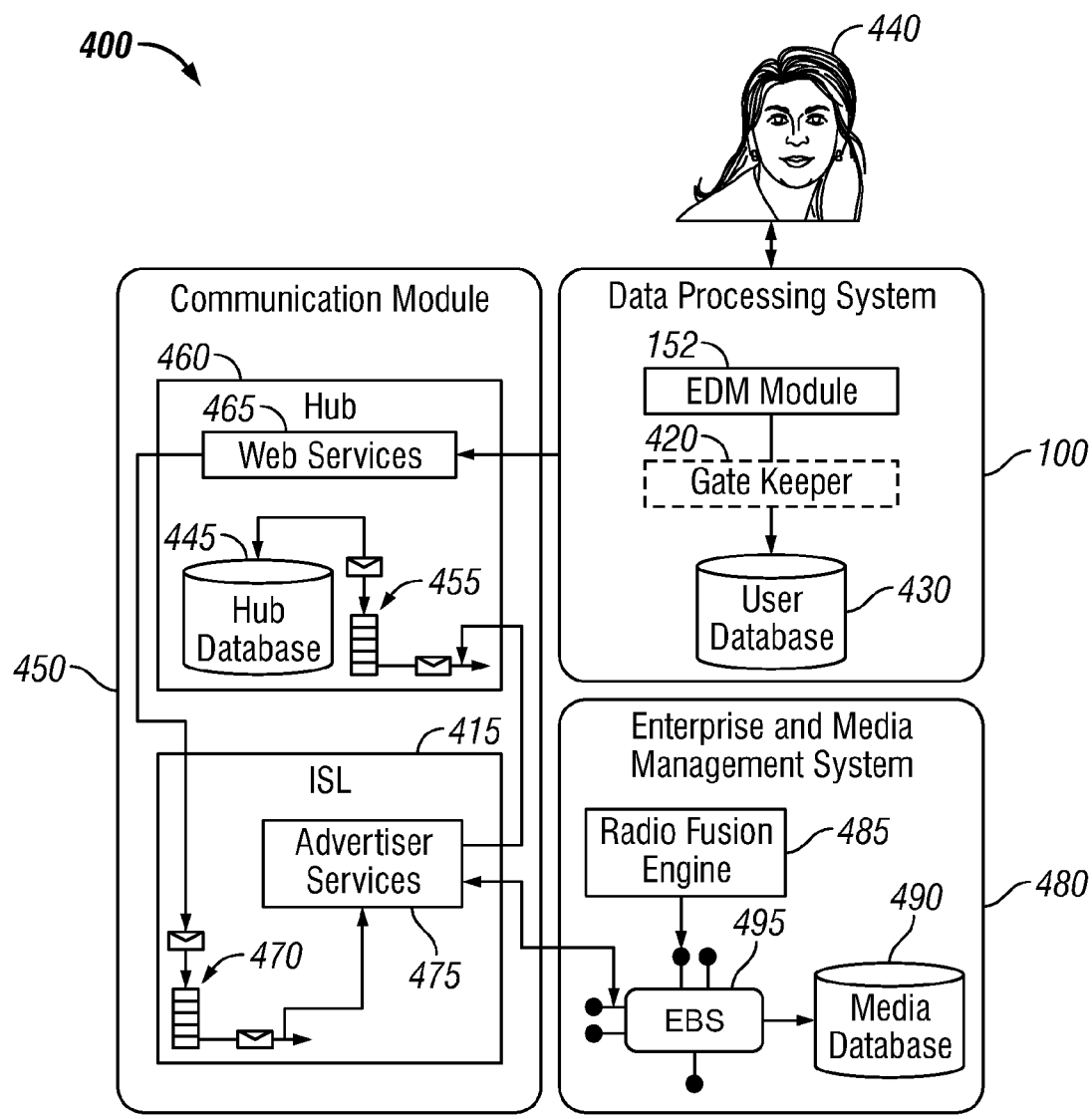
FIG. 4 illustrates a block diagram of a media advertising enterprise data management system, in accordance with the disclosed embodiments.

FIG. 4 illustrates a block diagram of a media advertising enterprise data management (EDM) system 400, in accordance with the disclosed embodiments. Note that in FIGS. 1-11, identical or similar blocks are generally indicated by identical reference numerals. The EDM system 400 matches a market entity to a central enterprise entity to permit consolidated reporting at an enterprise level. Note that the term "entity" refers generally to "advertiser" or "agency". The term entities can be used to describe situations that affect both the advertisers and agencies, for example, unmatched entities.

The EDM system 400 generally includes the data processing system 100, a communication module 450, and an enterprise and media management system 480. The data processing system 100 can provide access to a set of users 440 with respect to the enterprise and media management system 480. Data-processing system 100 depicted in FIG. 1 can be, for example, a server. Other devices such as, for example, desktops, network devices, palmtops, mobile phones, etc., may also be included in the enterprise data management system 400, as service providers.

The data-processing system 100 can be configured to include an EDM module 152 and a user database 430. The EDM module 152 can interact with and manage data in various enterprise and media applications and management solutions. The enterprise and media management system 480 can be, for example, VIERO®, transACT™, FUSION platforms that are trademarked and provided by Clear Channel to provide just-in-time advertising and extensibility services. The EDM module 152 can run under the credentials of the user logged operating system and utilize an integrated login in order to authenticate the user 440. Such a module can thus include instructions, which are stored in a computer memory and then retrieved and executed by, for example, a data-processing system such as, for example, the system 100 depicted in FIG. 1.

The EDM module 152 can authenticate the user 440 by accessing a domain login and security privilege with respect to the user 440 that are locally stored in the user database 430. When the user 440 access the system 400, the EDM application 152 validates the domain login of the logged user with respect to the domain user name stored in the user database 430 via a gate keeper service 420 and checks if the user 440 is authorized to access the application 152. If the domain user name associated with the user 440 exists, the EDM module 152 validates and provides access to the required application.

The communication module 450 provides enterprise matching of distributed and disconnected entity records from user inputs. Such a process can accurately match the similar entity records regardless of the manual input, the location, and format of the records in the distributed system 480. The EDM module 152 includes a fuzzy logic to match an active entity with respect to an unmatched entity and an enterprise entity. The system 400 organizes the disparate records utilizing a set of rules and a matching process to efficiently manage unorganized, un-useable records in the enterprise record set. The system 400 therefore provides a variety of capabilities for managing and reporting advertising records at the enterprise level. The process can start with an initial set of user inputs and adapt and learn behavior as users interact with the system 400.

The communication module 450 generally includes a hub 460 associated with a hub database 445, web services 465, and a hub queue 455. Note that the hub 460 can be a network hub or repeater hub for connecting multiple twisted pair or fiber optic Ethernet devices together and thus making them act as a single network segment. Hubs work at the physical layer (layer 1) of the OSI model. The device is thus a form of multiport repeater. Repeater hubs also participate in collision detection, forwarding a jam signal to all ports if it detects a collision.

The EDM module 152 interacts and manages data in the databases of instances associated with transACT™ and FUSION. The communication module 450 also includes an inter-switch link 415 that includes an inter-switch link queue 470 and an advertiser service 475. The media management system 480 associated with the EDM system 400 can include a radio fusion engine 485, a media database 490, and an enterprise bus service (EBS) 495. In general, fusion enabled entity can be stored into the radio fusion engine 485 and other entities can be stored in the advertiser services 475 associated with the communication module 450. A new advertiser/agency is required to be matched by the EDM module 152 and assigned a unique enterprise ID. Any key changes to the advertiser/agency records require that the record be re-matched and re-assigned and assigned a new Enterprise ID.

If a record to be re-matched is received from the advertiser service 475, the hub database 445 can check the advertiser ID or fusion ID associated with the record and update the name, revenue type, or industry code for the record. The changes with respect to the record can be automatically updated in the hub database 445 based on the advertiser ID/fusion ID and therefore, when the user 440 logs into the EDM application 152, the changes can be visible. Additionally, when the advertiser service 475 transmits a record to be reassessed to the hub 460, it also transmits an 'Old Enterprise ID' in a response message which can be helpful for the user 440 to re-match the entity record. The proposals for advertisers/agents can be created in the radio fusion engine 485 for fusion enabled markets and once the proposal becomes an order, the records associated with the advertiser/agent can be moved from the advertiser service 475.

The EDM module 152 can pull the records from the advertiser services 475 and the radio fusion engine 485 utilizing a windows service (DPEDM) at regular time intervals. The advertiser services 475 and the radio fusion engine 485 provide a response message that includes unmatched entity records with respect to the user request. The user 440 can further match the advertisers/agents with their respective enterprise entities and store the records into the media database 490 associated with the media management system 480. The media database 490 includes a 'tAdvertiser' and a 'tAgency' table that can be employed to store the advertiser and agent records individually. If a record exists in both fusion engine 485 and the advertiser service 475, then the scores of both records can be combined in order to ensure that each entity can possess a single score. All the retrieved records can be further prioritized based on the associated score in the media database 490. The records with the highest score can be provided the highest priority and assigned to a parent enterprise advertiser/agency.

Figure 5:
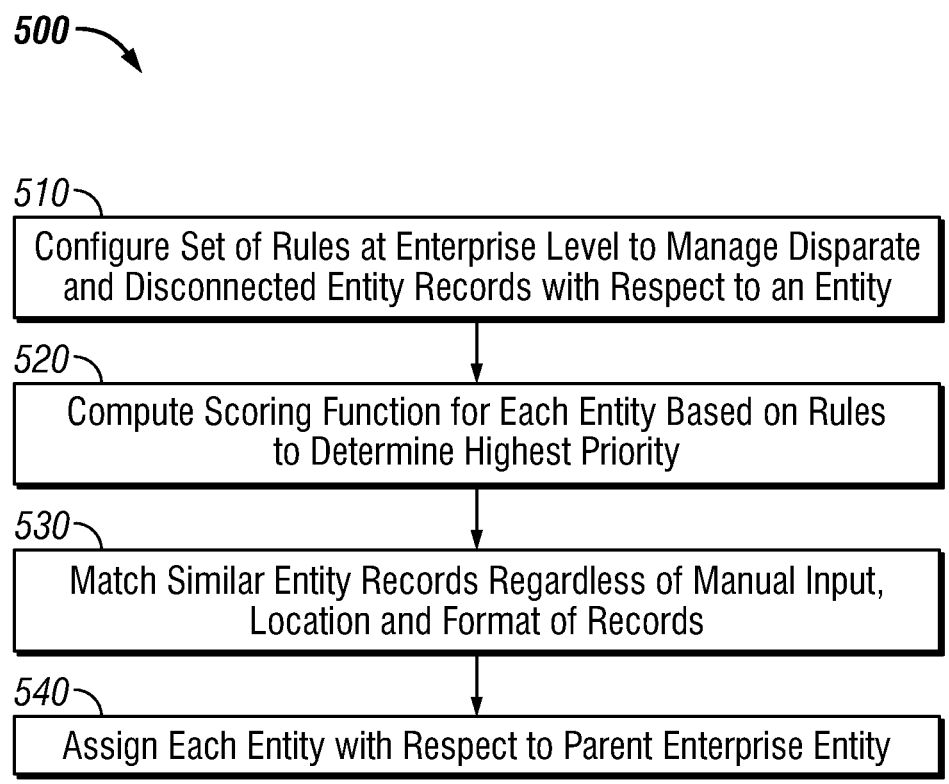
FIG. 5 illustrates a high-level flow chart of operations illustrating logical operational steps of a method for managing media advertising enterprise data, in accordance with the disclosed embodiments.

FIG. 5 illustrates a high-level flow chart of operations illustrating logical operational steps of a method 500 for managing media advertising enterprise data, in accordance with the disclosed embodiments. It can be appreciated that each of the steps or logical operations of the method 500 depicted in FIG. 5 can be implemented by executing a program instruction or a group of instructions in the data-processing system 100. The instructions depicted in FIG. 5 can be provided by, for example, a module or group of modules, as discussed earlier herein.

The EDM system 400 can be an automated system that selects the advertisers/agents to match and provides a list of possible matches. The user 440 can further make a final decision to match the advertiser/agency or to add it as a new enterprise advertiser/agency in the EDM system 400. Unmatched advertisers/agencies can be presented utilizing a ranking system that permits the user 440 to match advertisers with the highest revenue or market ranking. The system 400 can provide accurate reporting of advertiser records that is required for better management decisions and, therefore, enterprise advertiser information can be as reliable as possible.

A set of rules can be configured at an enterprise level to manage the disparate and disconnected market entity records, as depicted at block 510. A scoring function can be computed for each entity (advertiser/agency) associated with the EDM system 400 based on the rules in order to determine the highest priority, as illustrated at block 520. The similar entity records can be matched regardless of manual input, location, and format of the entity records, as indicated at block 530. Thereafter, each entity can be assigned with respect to a parent enterprise entity, as illustrated at block 540. The method and system described herein can therefore provide an optimization mechanism for interactively managing and reporting market entity records at the enterprise level in a simple and efficient manner. The enterprise advertiser is the parent advertiser for identical advertisers in the markets. The advertiser can be created in the EDM system 400 and the like market advertisers can be linked to it. The enterprise advertiser's order information from multiple markets can be consolidated for enterprise reporting once a link has been set up.

Figure 6:
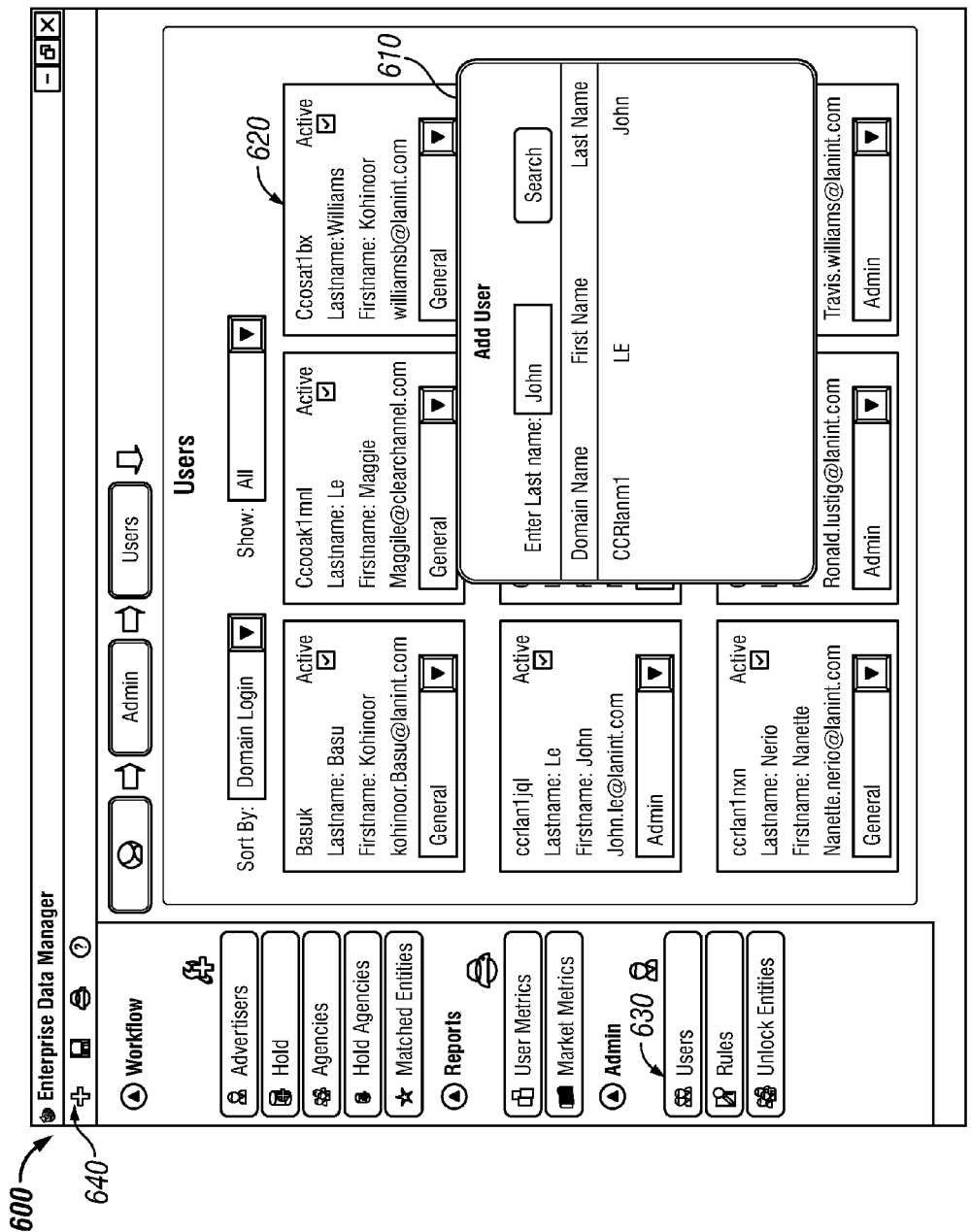
FIG. 6 illustrates a graphical user interface that displays user information associated with the EDM system, in accordance with the disclosed embodiments.

FIG. 6 illustrates a graphical user interface 600 that displays user information associated with the EDM system 400, in accordance with the disclosed embodiments. Note that the GUI 600, 850, and/or 860 can be implemented utilizing a GUI such as, for example, the GUI 153 depicted in FIG. 1 herein and may be provided by a module such as, for example, module 152 (i.e., a software application). GUI 600, 850, and/or 860 can be displayed via a display device such as monitor 106 depicted in FIG. 1. In the illustrated figures herein, the depicted GUI can be implemented in the context of a GUI "window". Note that in computing, a GUI window is generally a visual area containing some type of user interface (e.g., GUI 153). Such a "window" usually (but not always) possesses a rectangular shape and displays the output of and may allow input to one or more processes. Such windows are primarily associated with graphical displays, where they can be manipulated with a mouse cursor such as, for example, the pointing device 105 depicted in FIG. 1. A GUI using windows as one of its main "metaphors" is often referred to as a windowing system.

An EDM administrator can access the GUI 600 to manage users and monitor activity. The GUI 600 can include functions such as, for example, to view existing EDM user information, add new users to access the EDM application, deactivate an active EDM user, and assign security privileges for each individual EDM user. The GUI 600 displays user cards such as a card 620 for all the existing EDM users in association with their details by accessing an icon 630. If the user "clicks" the icon 630, the GUI 600 provides information associated with the user. The user information can include, for example, domain login (usually with CCR followed by four digit code for the market and end with user's initials), first name, last name, email, role (admin or general), and active information. When displaying a user record, most information can be transferred from the user's employee record to the EDM module 152.

The employee information can be retrieved through the gatekeeper service 420 using a 'BulkGetUsers' web method. The 'BulkGetUsers' web method returns all the user records. EDM module 152 can run a daily process to acquire the data from the gatekeeper service 420 and store the data in the 'tUserSetting' table associated with the EDM user database 430. The active EDM users and their details can only be displayed on the GUI 600. If the user "clicks" the add icon 640, the GUI 600 displays a popup window 610 that permits an administrator to add new users. The 'add user' popup window 610 provides an option to search users by last name and add them to the list of active users that are authorized to use the EDM application 152. Once the user has been added to the list of active EDM users, they can be assigned a role such as admin or general in order to determine the level of access to the application.

Figure 7:
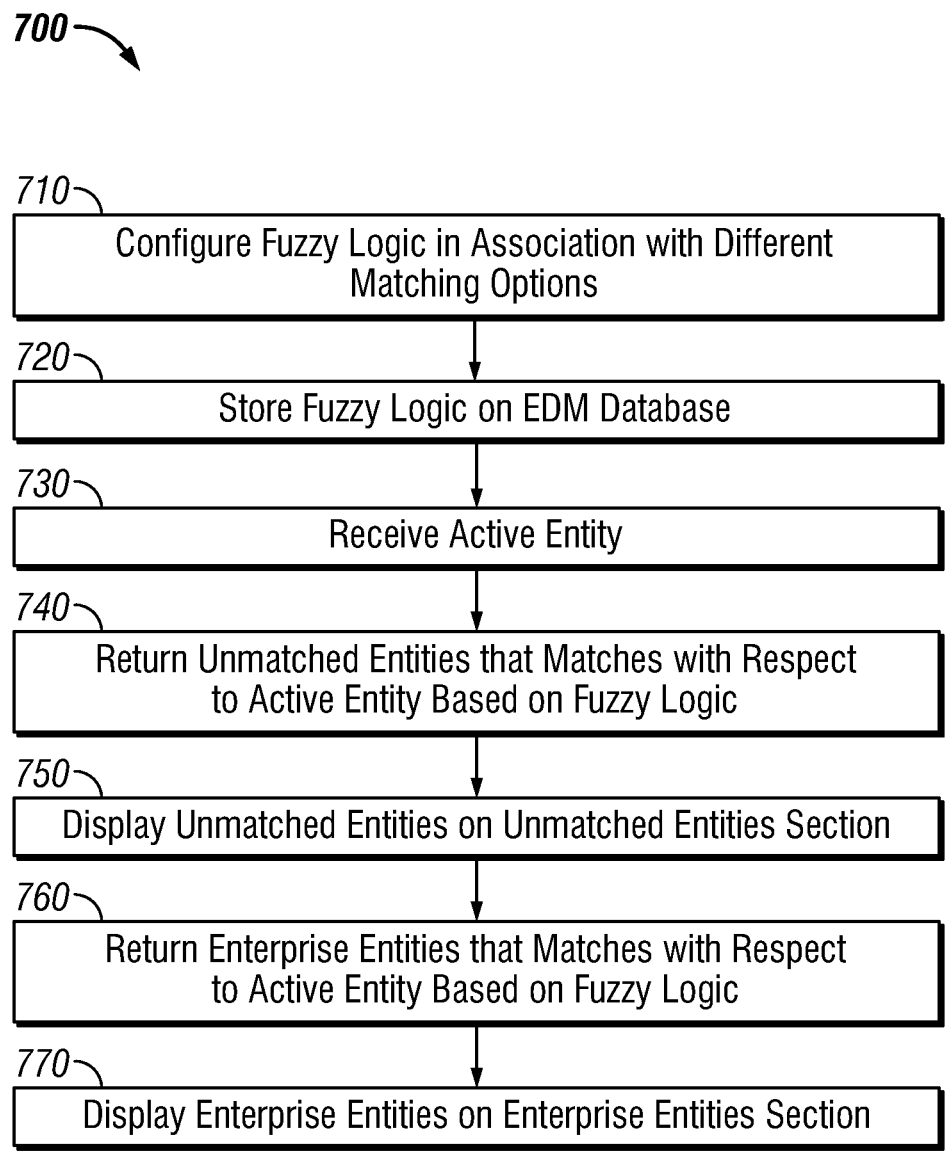
FIG. 7 illustrates a high-level flow chart of operations depicting logical operational steps of a method, which incorporates the use of fuzzy logic, in accordance with the disclosed embodiments.

FIG. 7 illustrates a high-level flow chart of operations depicting logical operational steps of a method 700, which incorporates the use of fuzzy logic, in accordance with the disclosed embodiments. As indicated in FIG. 7 and at block 710, a fuzzy logic may be configured in association with varying/different matching options. Next, as indicated at block 720, the fuzzy logic can be stored in an EDM database. Thereafter, as depicted at block 730, the active entity can be received. Then, as illustrated at block 740, one or more unmatched entities can be returned, which respectively match to an active entity based on the aforementioned fuzzy logic. Following processing of the operation depicted at block 740, an operation can be processed in which one or more unmatched entities are displayed in/on an unmatched entities section of a GUI, such as the GUI described herein. Next, as illustrated at block 760, one or more enterprise entities can be returned, which respectively match to an active entity based on the aforementioned fuzzy logic. Thereafter, as illustrated at block 770, enterprise entities can be displayed in an enterprise entities section of a GUI, as discussed herein.

In general, a GUI can display an unmatched entity section and an enterprise entity section, in accordance with the disclosed embodiments. The active entity is an entity in, for example, an 'Advertiser' or 'Agency' table stored in a database, such as database 430, which possesses a "highest" score and which has not been assigned to a user. The system 400 automatically populates the active entity section with a brand new entity which has the highest score the very first time the EDM user 440 navigates to, for example, a GUI advertiser screen. The user 440 may continue working on the active entity until he or she decides to acquire the next active entity. If the user 440 is currently working on one active entity, then each time the user re-navigates to the entity screen, the active entity can be automatically populated with the same active entity.

Such an enterprise entity section can serve to display all the enterprise entities from the table that are exact, like and fuzzy matches to the active entity. The information such as, for example, name, industry, revenue type, enterprise ID, phone, address 1, address 2, city, state, zip code, contact, and contact phone can be displayed for each of the enterprise entity records. The records can be prioritized in alphabetic order if there are one or more entity records with the same score. Prioritization ensures that the most important entities can be considered first while assigning them to the user.

The aforementioned unmatched entity section can also display all the unmatched entities that are either exact or fuzzy matches to the active entity from the table. The numbers of unmatched entities that are displayed can be configured to be, for example, 100. The first record in the unmatched entity section can be the active entity record which can be bolded to differentiate it from the other records. The exact and fuzzy matching can be solely based on the unmatched entity name. If there is more than one exact match then the records can be sorted in descending order of score. Similarly, if there is more than one fuzzy match then those records can also be sorted in descending order of score. The active entity and all the similar matches returned by the fuzzy logic can be locked for the specific user. The information can be displayed for each unmatched entity records, can be for example, name, market, industry, revenue type, revenue ($), phone, address 1, address 2, city, state, zip code, contact, contact phone, and old enterprise entity. The old enterprise entity can be displayed if the entity is previously matched and some key information for an entity changed.

Figure 8:
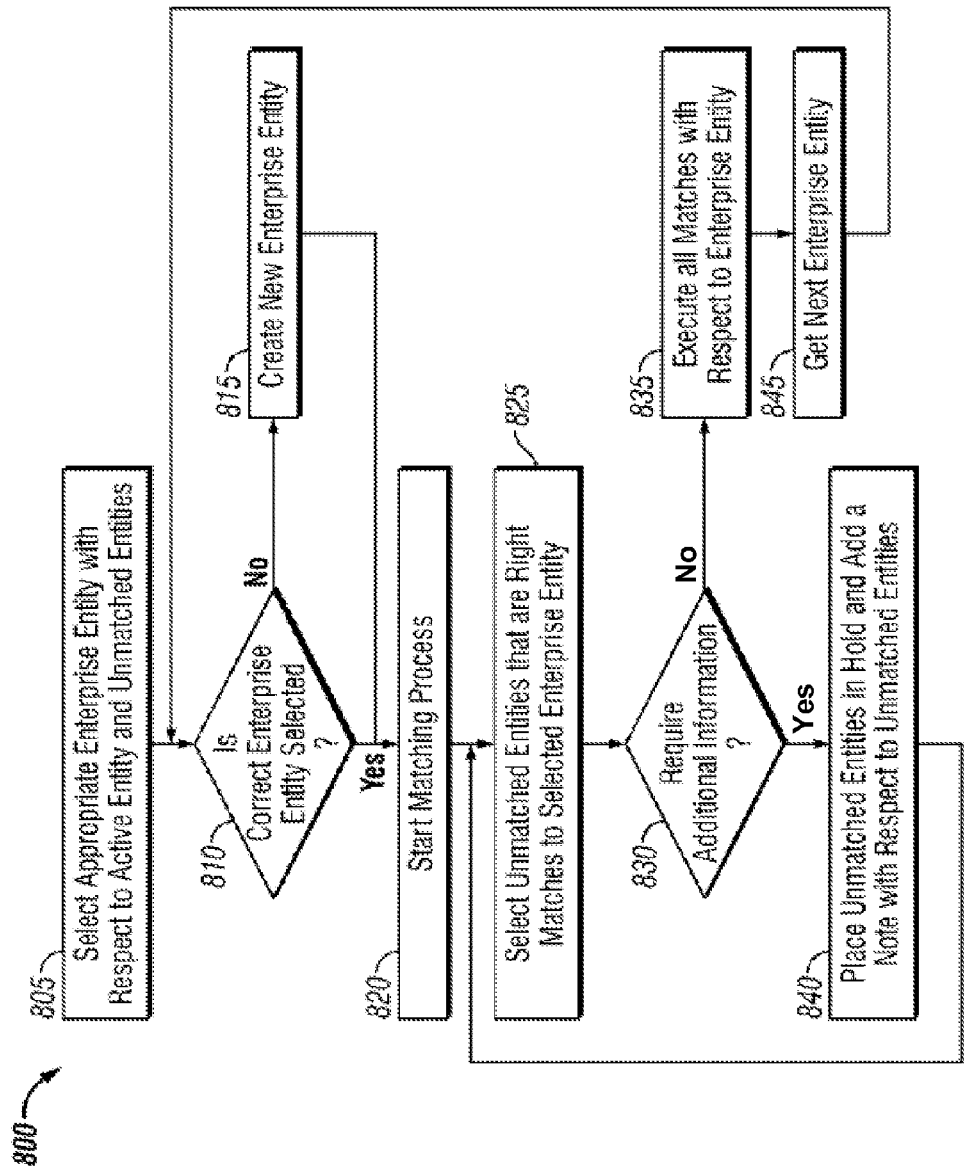
FIG. 8 illustrates a high-level flow chart of operations illustrating logical operational steps of a method for accurately matching an active entity and unmatched entities with respect to a parent enterprise entity, in accordance with the disclosed embodiments.

FIG. 8 illustrates a high-level flow chart of operations illustrating logical operational steps of a method 800 for accurately matching an active entity and unmatched entities with respect to a parent enterprise entity, in accordance with the disclosed embodiments. Note that the method 800 can be implemented in the context of a computer-useable medium that contains a program product. The EDM module 152 can be configured to include a set of rules at an enterprise level to manage disparate and disconnected records (e.g., advertiser/agency records). A scoring function with respect to each record can be computed based on the rules to determine the highest priority.

A fuzzy logic can be configured in association with varying matching options to select appropriate enterprise entity with respect to the active entity and unmatched entities, as depicted at block 805. A determination can be made whether a correct/right enterprise entity is selected, as indicated at block 810. If the selected enterprise entity is not correct, a new enterprise entity can be created, as indicated at block 815. Otherwise, a matching process can be performed if the active entity, unmatched entity, and the enterprise entity section are populated with the required data, as illustrated at block 820. The unmatched entities that are right matches to the enterprise entities can be selected, as depicted at block 825. A determination can be made whether additional information is required, as indicated at block 830.

If additional information is not required, then the operations indicated at blocks 835 and 845 are processed. That is, as illustrated at block 835, all matches can be executed with respect to the enterprise entity. Then, as depicted at block 845, the next enterprise entity can be selected, following by processing of the operations depicted at blocks 810, etc. Thus, the next enterprise entity can be acquired and the matching process can be performed, as depicted at block 845. If additional information is required, then as indicated at block 840, the unmatched entity can be placed on hold with respect to performing a correct match and a note regarding such facts can be added.

The unmatched entities can be matched one record at a time and can be assigned to the enterprise entity that is selected by default. A different enterprise entity can also be selected if the default selected enterprise entity is not appropriate. The records can be assigned to the enterprise entity iteratively or can be assigned all at once. Additionally, few entities can be assigned to one enterprise entity and the other entities can be assigned to a different enterprise entity.

Figure 9:
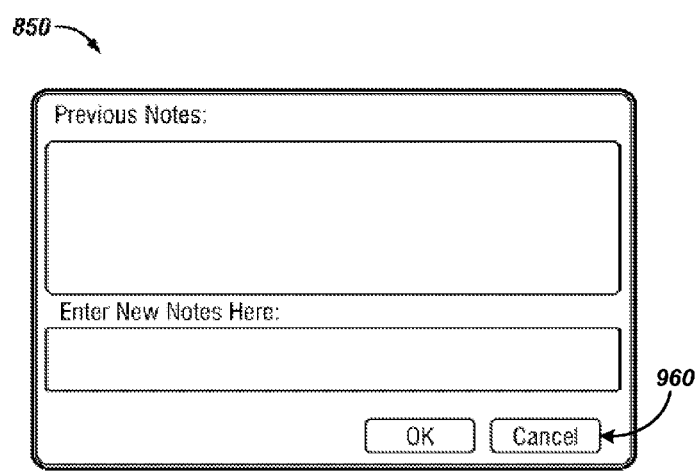
FIG. 9 illustrates a graphical user interface for adding note in order to place unmatched entity on hold, in accordance with the disclosed embodiment.

FIG. 9 illustrates a graphical user interface 850 for adding a note in order to place unmatched entity on hold, in accordance with the disclosed embodiment. Note that the user interface as utilized herein generally refers to a type of environment that represents programs, files, options, and so forth by means of graphically displayed icons, menus, and dialog boxes on a screen. A user can interact with the user interface to select and activate such options by pointing and clicking with a user input device such as, for example, a touch screen, a keyboard, or the like. A particular item can function in the same manner to the user in all applications because the user interface provides standard software routines to handle these elements and reports the user's actions.

Figure 10:
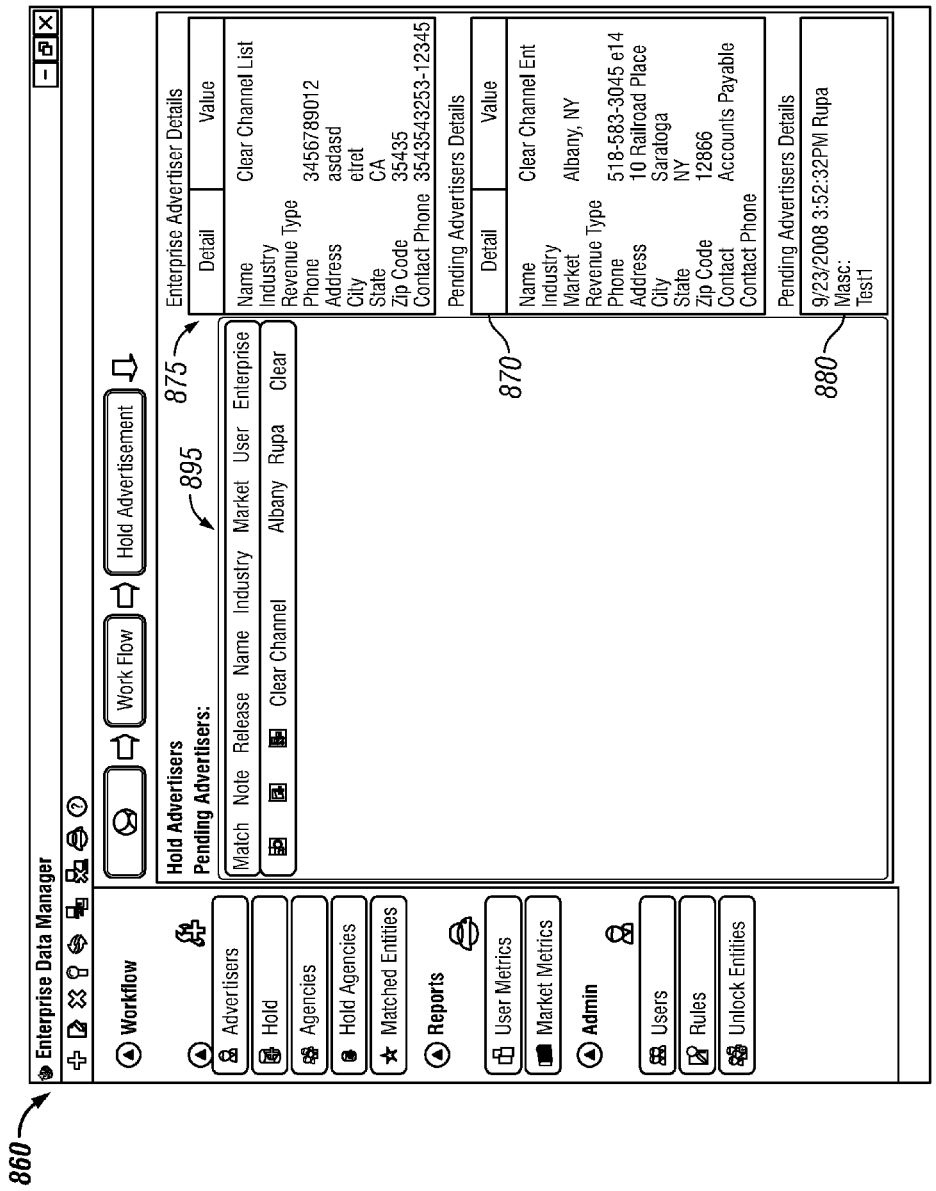
FIG. 10 illustrates a graphical user interface that displays pending advertisers, in accordance with the disclosed embodiment.

The unmatched entities can be put on hold if additional information is required. If the user "clicks" the icon 640 in the hold column associated with the GUI 600, the popup window 850 can be displayed prompting the user to enter a note prior to placing the unmatched entity on hold. The user needs to ensure that an enterprise entity is selected while putting an advertiser on hold. If the enterprise entity is not selected, then the error message "Select an Enterprise Advertiser" can be displayed. The note can be added once the enterprise entity is selected after which the advertiser moves to a hold entity screen, as depicted in FIG. 10. The interface 850 permits the user to view notes and even enter a note without having to place an entity on hold. If the user opens the note popup window 850 but does not enter any text, then the message "please enter a note" can be displayed. The user can choose not to put an advertiser on hold by selecting a cancel button 960 in the note popup window 850.

FIG. 10 illustrates a graphical user interface 860 that displays pending advertisers section 895, in accordance with the disclosed embodiment. The GUI 860 permits an EDM user to view all the unmatched entities that is put on hold. The unmatched entities can be put on hold when waiting for additional information and the user is not completely sure of a right match. The user can be forced to add a note and select an enterprise entity while putting the entities on hold in the GUI 600 regardless of the currently logged in user. The GUI 860 displays all the records for the logged in user first and all the other users in alphabetic order. The pending advertiser details associated with the advertiser that is selected/highlighted can be displayed in a pending advertiser column 870. The details can change dynamically as the selected advertiser changes. The enterprise advertiser details associated with the enterprise advertiser that is populated can be displayed in the enterprise advertiser column 875. The notes for the advertiser can be displayed in the notes column 880.

Figure 11:
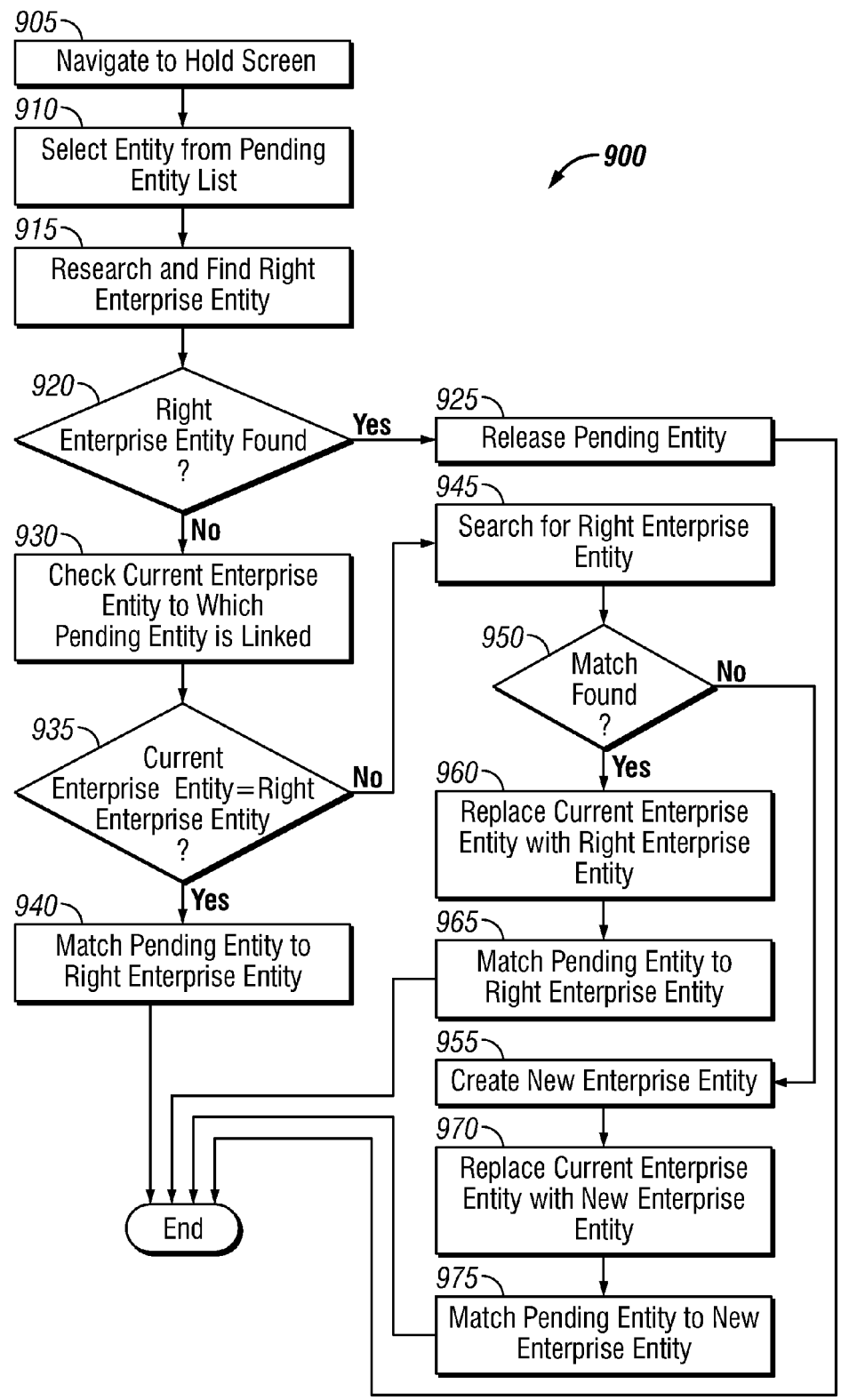
FIG. 11 illustrates a high-level flow chart of operations illustrating logical operational steps of a method for resolving on-hold entities, in accordance with the disclosed embodiments.

FIG. 11 illustrates a high-level flow chart of operations illustrating logical operational steps of a method 900 for resolving on-hold entities, in accordance with the disclosed embodiments. The GUI (hold screen) 860 can be navigated for matching pending entity record to the correct/right enterprise entity, as illustrated at block 905. The record can be selected from the pending entity section 810, as depicted at block 910. The correct enterprise entity can be researched for the selected entity record, as indicated at block 915. A determination can then be made if the correct enterprise entity is found, as illustrated at block 920. If the correct enterprise entity is identified, then the operation indicated at block 925 is processed. Otherwise, the operation illustrated at block 930 can be processed. That is, the current enterprise entity to which the pending entity is linked can be checked, as depicted at block 930. Otherwise, the hold entity record can be released, as indicated at block 925 (i.e., release pending entity).

A determination can be made whether the current enterprise entity is the correct enterprise entity, as illustrated at block 935. If the current enterprise entity is the correct enterprise entity, the pending entity record can be matched with the correct enterprise entity record, as depicted at block 940. Otherwise, the correct enterprise entity can be searched by the user, as indicated at block 945. Another determination can be made whether a match is found, as illustrated at block 950. If a match is found, the current enterprise entity can be replaced with the correct enterprise entity, as depicted at block 960. The pending record can then be matched with the correct enterprise entity, as indicated at block 965. Otherwise, a new enterprise entity can be created, as illustrated at block 955. The current enterprise entity can then be matched with the new enterprise entity, as depicted at block 970. The pending entity can then be matched with the new enterprise entity, as indicated at block 975.

The user interface 600, 850, and/or 860 in conjunction with the EDM module 152, provides a unique and innovative way to store, retrieve, and manipulate data from existing databases containing media-related data. By using the database with a simplified storage and retrieval protocol, the data contained therein can be effectively manipulated in real time. The user interface provides access to both the EDM application and the optimization mechanism in a simple and straightforward manner, significantly reducing training time. The EDM module 152 can provide a team of users with the ability to match duplicate advertiser and agency records to one master record. The system 400 provides a seamless path for "isolated" or distributed media records to integrate into a common ad management and display.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method, comprising:
   configuring a set of rules in order to manage a plurality of unmatched records, each individual record of the plurality of unmatched records is associated with a market entity, by executing a program instruction in a data-processing system;
   computing a scoring function, based on the set of rules, to assign an individual rank to each individual record based on one of revenue and market ranking associated with the market entity to which the individual record is associated, by executing a program instruction in a data-processing system;
   selecting a highest-ranking market entity from a plurality of market entities as an active entity, by executing a program instruction in a data-processing system;
   matching said active entity to at least one of a remaining plurality of market entities, by executing a program instruction in a data-processing system;
   determining whether the active entity matches a parent enterprise entity, by executing a program instruction in a data-processing system;
   in response to determining that the active entity matches the parent enterprise entity:
      assigning the active entity and matched at least one of the remaining plurality of market entities to the parent enterprise entity, by executing a program instruction in a data-processing system;
      linking unmatched records associated with the at least one of the remaining plurality of market entities to the parent enterprise entity, by executing a program instruction in a data-processing system;
   receiving, from an advertiser service:
      at least one updated record to be reassessed;
      a current identifier indicating a current parent enterprise entity with which the at least one updated record is currently associated;
      wherein reassessing includes determining whether the parent enterprise entity currently associated with the updated record is to be changed; and
   re-matching the at least one updated record to an updated parent enterprise entity.

2. The method of claim 1 further comprising repeating said matching process for each of the plurality of market entities until each of a plurality of unmatched entities are assigned to at least one parent enterprise entity, by executing a program instruction in a data-processing system.

3. The method of claim 1, wherein the unmatched records include order information for a plurality of market entities associated with a plurality of different markets.

4. The method of claim 3, further comprising:
consolidating order information for the parent enterprise entity across the plurality of different markets.

5. The method of claim 1, further comprising:
obtaining the plurality of unmatched records from a plurality of different sources, wherein a same unmatched record from different sources is associated with multiple scores.

6. The method of claim 5, wherein computing a scoring function further comprises:
combining the multiple scores into a single score.

7. A system, comprising:
a processor;
a data bus coupled to said processor; and
a computer-usable medium embodying computer code, said computer-usable medium being coupled to said data bus, said computer program code comprising instructions executable by said processor and configured for;
organizing a set of rules in order to manage a plurality of unmatched records, each individual record of the plurality of unmatched records is associated with a market entity;
computing a scoring function, based on the set of rules, to assign an individual rank to each individual record based on one of revenue and market ranking associated with the market entity to which the individual record is associated;
selecting a highest-ranking market entity from a plurality of market entities as an active entity;
matching said active entity to at least one of a remaining plurality of market entities;
determining whether the active entity matches a parent enterprise entity;
in response to determining that the active entity matches the parent enterprise entity:
assigning the active entity and matched at least one of the remaining plurality of market entities to the parent enterprise entity;
linking unmatched records associated with the at least one of the remaining plurality of market entities to the parent enterprise entity; and
in response to determining that additional information is required in order to determine that the active entity matches the parent enterprise entity, assigning a hold status to said active entity and matched at least one of the remaining plurality of market entities;
receiving, from an advertiser service:
at least one updated record to be reassessed;
a current identifier indicating a current parent enterprise entity with which the at least one updated record is currently associated;
wherein reassessing includes determining whether the parent enterprise entity currently associated with the updated record is to be changed; and
re-matching the at least one updated record to an updated parent enterprise entity.

8. The system of claim 7, wherein said instructions are further configured for:
adding a note with respect to said active entity and matched at least one of the remaining plurality of market entities in order to assign said hold status.

9. The system of claim 7, wherein said instructions are further configured for identifying a correct enterprise entity and assigning said active entity and matched at least one of the remaining plurality of market entities with said hold status to said correct enterprise entity.

10. The system of claim 7, wherein said instructions are further configured for creating a new enterprise entity and assigning said active entity and matched at least one of the remaining plurality of market entities with said hold status to said new enterprise entity.

11. The system of claim 7, wherein said instructions are further configured for repeating said matching process for each of the plurality of market entities until each of a plurality of unmatched entities are assigned to at least one parent enterprise entity.

12. A system, comprising:
a processor;
a data bus coupled to said processor; and
a computer-usable medium embodying computer code, said computer-usable medium being coupled to said data bus, said computer program code comprising instructions executable by said processor and configured for:
organizing a set of rules in order to manage a plurality of unmatched records, each individual record of the plurality of unmatched records is associated with a market entity;
computing a scoring function, based on the set of rules, to assign an individual rank to each individual record based on one of revenue and market ranking associated with the market entity to which the individual record is associated;
selecting a highest-ranking market entity from a plurality of market entities as an active entity;
matching said active entity to at least one of a remaining plurality of market entities;
determining whether the active entity matches a parent enterprise entity;
in response to determining that the active entity matches the parent enterprise entity, linking unmatched records associated with the at least one of the remaining plurality of market entities to the parent enterprise entity; and
in response to determining that additional information is required in order to determine that the active entity matches the parent enterprise entity, assigning a hold status to said active entity and matched at least one of the remaining plurality of market entities;
receiving, from an advertiser service:
at least one updated record to be reassessed;
a current identifier indicating a current parent enterprise entity with which the at least one updated record is currently associated;
wherein reassessing includes determining whether the parent enterprise entity currently associated with the updated record is to be changed; and
re-matching the at least one updated record to an updated parent enterprise entity.

13. The system of claim 12, wherein said instructions are further configured for:
adding a note with respect to said active entity and matched at least one of the remaining plurality of market entities in order to assign said hold status.

14. The system of claim 12, wherein said instructions are further configured for identifying a correct enterprise entity and assigning said active entity and matched at least one of the remaining plurality of market entities with said hold status to said correct enterprise entity.

15. The system of claim 12, wherein said instructions are further configured for creating a new enterprise entity and assigning said active entity and matched at least one of the remaining plurality of market entities with said hold status to said new enterprise entity.

16. The system of claim 12, wherein said instructions are further configured for repeating said matching process for each of the plurality of market entities until each of a plurality of unmatched entities are assigned to at least one parent enterprise entity.

\* \* \* \* \*